United States Patent [19]
Zagdoun et al.

[11] Patent Number: 5,776,603
[45] Date of Patent: Jul. 7, 1998

[54] GLAZING PANE EQUIPPED WITH AT LEAST ONE THIN FILM AND METHOD OF MANUFACTURING THE SAME

[75] Inventors: Georges Zagdoun, La Garenne Colombes; Victor Corinne, Saint-Leu La Foret, both of France

[73] Assignee: Saint-Gobain Vitrage, Aubervilliers Cedex, France

[21] Appl. No.: 561,387

[22] Filed: Nov. 21, 1995

[30] Foreign Application Priority Data

Nov. 21, 1994 [FR] France ................................ 94 13911

[51] Int. Cl.$^6$ ................................................ B32B 17/06
[52] U.S. Cl. ........................ 428/336; 359/580; 359/586; 359/589; 427/164; 427/165; 427/166; 427/167; 427/255.2; 427/255.3; 427/255.7; 65/60.5; 65/60.8; 428/212; 428/216; 428/428; 428/432; 428/697; 428/698; 428/699; 428/704
[58] Field of Search ........................ 428/216, 212, 428/336, 697, 699, 704, 698, 428, 432; 427/164, 165, 166, 167, 255.2, 225.3, 255.7; 65/60.5, 60.8; 359/580, 586, 589

[56] References Cited

U.S. PATENT DOCUMENTS

| | | | |
|---|---|---|---|
| 4,568,578 | 2/1986 | Arfsten et al. | 428/697 |
| 4,599,272 | 7/1986 | Ichikawa | 428/428 |
| 4,919,778 | 4/1990 | Dietrich et al. | 204/192.27 |
| 5,085,926 | 2/1992 | Iida et al. | 428/432 |
| 5,201,926 | 4/1993 | Szczyrbowski et al. | 65/60.2 |
| 5,266,358 | 11/1993 | Uemura et al. | 427/376.2 |
| 5,271,960 | 12/1993 | Proscia | 427/164 |
| 5,415,794 | 5/1995 | Kawaguchi et al. | 428/698 |
| 5,514,454 | 5/1996 | Boire et al. | 428/216 |
| 5,520,996 | 5/1996 | Balian et al. | 428/428 |

FOREIGN PATENT DOCUMENTS

| | | |
|---|---|---|
| 0536607 | 9/1992 | European Pat. Off. . |
| 0536607 | 4/1993 | European Pat. Off. . |
| 0546302 | 6/1993 | European Pat. Off. . |

*Primary Examiner*—Archene Turner
*Attorney, Agent, or Firm*—Oblon, Spivak, McClelland, Maier & Neustadt, P.C.

[57] ABSTRACT

This invention is a product comprising a transparent substrate of the glass substrate type (1), coated with at least one thin film (4) based upon an oxide comprising silicon, aluminum and at least one third element M facilitating the formation of a homogeneous mixed oxide structure of silicon and aluminum. The invention also concerns a method of manufacturing coated glass, especially by a gas phase pyrolysis technique, and its applications.

32 Claims, 1 Drawing Sheet

GLAZING PANE EQUIPPED WITH AT LEAST ONE THIN FILM AND METHOD OF MANUFACTURING THE SAME

BACKGROUND OF THE INVENTION

1. Field of the Invention

This invention relates to a product comprising a transparent substrate of the glass substrate type, which is provided with at least one thin film, for the purpose of manufacturing glazing panes known as functional panes, both for buildings and ships, as well as for vehicles. The invention is also interested in the techniques for depositing these various films.

2. Discussion of the Background

In the context of the invention, the term functional pane is to be understood as meaning a pane, at least one of the transparent constituent substrates of which is covered with a stack of thin films for the purpose of giving to it particular properties, notably thermal, optical or electrical properties.

Low-emissivity films, composed of doped metal oxide, such as tin oxide doped with fluorine ($SnO_2$:F) or indium oxide doped with tin (ITO), which can be deposited onto glass by pyrolysis techniques, are known. A pane with a substrate coated with a low-emissivity film, reduces emission in the far infrared through the pane to the outside, from a room of a building or the passenger compartment of a vehicle. Comfort is substantially improved due to the decrease in energy, especially in winter.

The coated substrate may be mounted as double glazing, with the low-emissivity film towards the gas-filled space between the two substrates, notably disposed on face 3 (the faces of a multiple pane are numbered, conventionally, starting from the outermost face relative to the room or passenger compartment). Thus, this double glazing has reinforced thermal insulation, with a low heat exchange coefficient K, while at the same time retaining the benefit of the solar energy input, with a high solar factor (solar factor is the ratio between the total energy entering the room and the incident solar energy). Reference may be made to patent applications EP-0 544 577, FR-2 704 543 and EP-0 500 445.

These low-emissivity films are also good electrical conductors. They can be used for producing heating/defrosting panes in automobiles, by providing them with electricity supply leads, an application described in patent EP-0 353 140.

Filtering thin films, also known as selective or anti-solar film which enable the heat input of the solar radiation through the pane into the room or compartment to be reduced by absorption/reflection when deposited on substrates mounted as a pane. These may be, for example, films of titanium nitride (or oxynitride) TiN, such as those produced by pyrolysis in gaseous phase and described in European patent applications EP-0 638 527 and EP-0 650 938.

Also known are stacks of antireflective films, usually made of alternating dielectric films of high and low refractive indices, especially in the case of substrates used as screens or shop windows.

The above-mentioned low-emissivity or filtering films frequently form part of a stack of films and typically have at least one of their faces in contact with another film of a dielectric material having an optical and/or protective role.

In the aforementioned patent applications EP-0 544 577 and FR-2 704 543, the low-emissivity film, for example of $SnO_2$:F, is surrounded by two film of dielectric of the $SiO_2$, SiOC or metallic oxide type. The films are chosen so as to adjust the visual appearance of the substrate, especially in reflection, by selection of the refractive index and thickness. By this selection, the color can be adjusted, for example.

In patent application EP-0 500 445, already mentioned, the low-emissivity film, notably of ITO, is overlain by an aluminum oxide film in order to protect it from oxidizing. Thus, in certain conditions, the need for subjecting it to a reducing reheating is eliminated, and/or making possible the bending or the toughening of the substrate after coating, without damaging its properties.

In EP-0 650 938 the film of $TiO_2$ or the double film of $TiO_2$/SiOC, which overlies the filtering film of TiN, also has the function of protecting the TiN against oxidizing, and of improving its durability in general.

The integrity of the stacks of thin films, especially their resistance to chemical attack, is important. It frequently occurs that the transparent substrate, after being coated with films, is stored for a fairly long period before being mounted as a pane. If not carefully packaged in a sealed, and therefore expensive, manner the films on the substrate may be exposed directly to a polluting atmosphere or subjected to cleaning by detergents not well suited for removing dust from the films, even if the substrates are later assembled as double glazing or as a laminated pane, with the thin films disposed on faces 2 or 3 and therefore protected. In addition to this problem of storage, stacks that are liable to chemical corrosion are unsuitable as "monolithic" panes, or configurations in which the films are exposed throughout the year to the ambient atmosphere, such as having the films on faces 1 or 4 in the case of multiple panes.

There is therefore a need for stacks of films of improved durability, particularly chemical durability. As mentioned above, there already exist overlying films of dielectric material, exerting a certain protection upon the underlying films in the stack. But none of those has a sufficiently high chemical durability to remain integral in the face of intense chemical corrosion or corrosion of long duration and/or for totally protecting the underlying films, which may well be more "fragile".

SUMMARY OF THE INVENTION

An object of the invention is a new thin film possessing, intrinsically, an improved chemical durability.

Another object of the invention is a thin film capable of forming part of a stack of thin films for the purpose of fulfilling an optical role and, if necessary, a protective role, preventing or reducing corrosion of a stack of thin films in which it is incorporated.

The invention has as its subject a product containing a transparent substrate of the glass substrate type, coated with at least one thin film based upon an oxide of silicon, aluminum and at least a third element denoted M, intended for facilitating the forming of a homogeneous mixed oxide structure of silicon and aluminum. It has been found important to add this third element M, which may be in a very small proportion by comparison with the other constituents of the film, but which nevertheless is necessary for assuring a good distribution of the silicon and the aluminum throughout the thickness of the film, particularly when the film is deposited by a pyrolysis technique.

The invention is also interested in the techniques for depositing these various films, and more especially in those that make use of a pyrolysis reaction: the latter consist of projecting "precursors", for example of organo-metallic nature, either in gaseous form or in the form of powder, or again in solution in a liquid, onto the surface of the substrate raised to high temperature. The precursors decompose on contact and leave a film of oxide, oxynitride, oxycarbide or nitride. The advantage of the pyrolysis lies in the fact that it enables the deposition of these films directly on the ribbon of glass of a continuous production line for sheet glass of the float type. The pyrolyzed films also have, in general, a very strong bond to the substrate.

One embodiment of the invention is a product having (a) a transparent substrate, and (b) a homogeneous thin film, on the substrate, the homogeneous thin film containing silicon, oxygen, aluminum and a third element M. The homogeneous thin film is the thin film based upon an oxide of silicon, aluminum and at least a third element denoted M, described above.

A second embodiment of the invention is a method for preparing a product by pyrolizing in the gas phase at least two precursors, thereby depositing the homogeneous thin film on the transparent substrate, where one precursor contains silicon, and the other precursor contains aluminum. A third embodiment of the invention is a pane having the homogeneous thin film, on a transparent substrate.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE INVENTION

Figure 1:
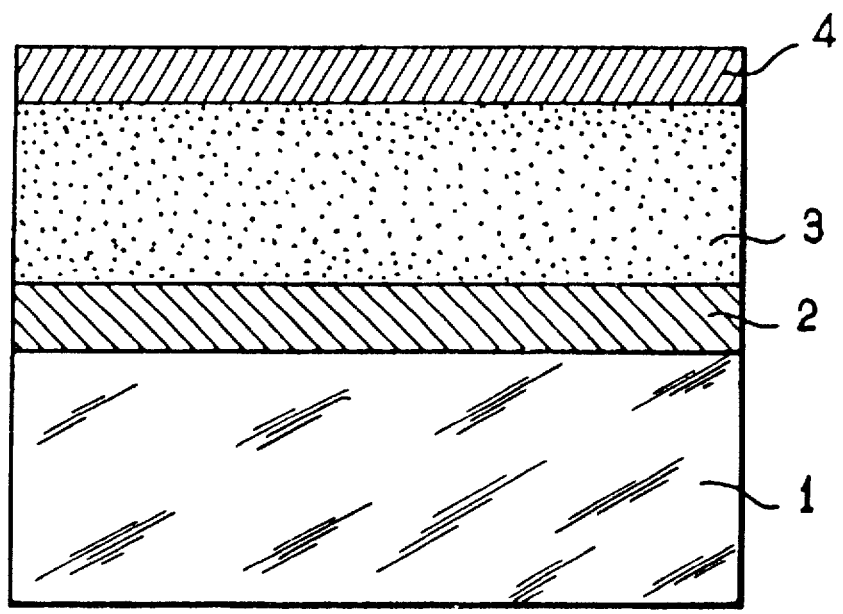
FIG. 1 is an embodiment of the invention, with a substrate 1, an underlying film 2, a functional film 3, and an overlying film 4.

Preferably, there is chosen as element M a halogen, more preferably fluorine, which has proved very effective in its function of "homogenizing" the composition of the final film.

The film may also contain other elements M', notably carbon in a small quantity.

The chemical formulation of the film may be set out in the form $SiAl_xO_yM_zM'_u$, with M preferably representing fluorine and M' preferably representing carbon. The preferred proportions of these different elements according to the invention are as follows:

x(Al): from 0.06 to 0.74; preferably from 0.14 to 0.33
y(O): from 2.1 to 3.1; preferably from 2.3 to 2.5
z(M): from 0.02 to 0.15; preferably from 0.04 to 0.08
u(M'): from 0 to 0.15; preferably from 0.03 to 0.04

Surprisingly, this type of thin film has proven very durable, and is especially resistant to chemical corrosion. The resistance to chemical corrosion was, in fact, unexpected in the light of the resistances possessed by thin films of silicon oxide $SiO_2$ or alumina $Al_2O_3$, and it may be attributed to a synergistic effect of the various elements that the mixed oxide of the invention contains.

It is possible to adjust the geometric thickness of the film, preferably between 30 and 180 nm, more preferably between 60 and 160 nm, even more preferably between 80 and 140 nm. Likewise, by modulating the ratios between Si, Al, O, M and optionally M' in an appropriate manner, it is possible to adjust the refractive index of the film, preferably between 1.42 and 1.60, more preferably between 1.44 and 1.46.

The ranges of thickness and refractive index make the film suitable for forming part of a stack of thin films, of which at least one film is termed functional and has thermal properties (filtering, selective, anti-solar, low-emissivity) or electrical properties. Examples include functional films of doped metallic oxide, or of nitride or of metallic oxynitride, notably tin oxide doped with fluorine, $SnO_2$:F, indium oxide doped with tin, ITO or titanium nitride, TiN. Doped zinc oxide may also be used, especially doped with indium, ZnO:In, with fluorine, ZnO:F, with aluminum, ZnO:Al or with tin, ZnO:Sn.

The film according to the invention may also preferably be placed in the stacks termed antireflective, containing alternating oxides (or other dielectric material) of high and low indices of refraction.

Stacks of this type are described in the patents referred to above, to which reference should be made for more details. Accordingly, the methods for making these stacks of thin films are well known to one of ordinary skill in the art.

Preferably, the film of the invention is the last in the stack: no film on the homogeneous thin film. With its refractive index, which may be relatively low, it may in fact fulfill a special optical role, by improving or adapting the appearance of the pane in reflection. In addition, as a result of its exceptional durability, the film of the invention will be able to resist deterioration and thus be able, if necessary, to protect the remainder of the stack, particularly against oxidation at high temperature, as well as chemical attack. By virtue of its capacity to resist corrosive attacks, it will not only protect itself, but also protect the remainder of the stack.

The invention is not limited to this sole configuration. The film of the invention can function as a barrier to the diffusion of alkaline ions of the K+ or Na+type. It is possible to place the film of the invention as the first of the stack, deposited directly onto the glass substrate, in order to form a screen against the alkalines, when the remainder of the stack contains films liable to deterioration on contact with the alkalines. In this configuration, it may also fulfil the role of "bonding" film with respect to the remainder of the stack. Thus its characteristics, and notably its hardness, will also enable it to function as a mineral underlying film beneath a film having hydrophobic/oleophobic properties, as described in patent application FR-94/08734, filed on 13 Jul. 1994, corresponding to European application EP-95/401G71.3 of 12 Jul. 1995 and U.S. application Ser. No. 08/501,577 of 12 Jul. 1995. This patent application concerns, in effect, a two-layer stack, comprising a "hard" mineral underlying film, on which is deposited a hydrophobic/oleophobic film produced by means of a hydrolyzable fluorinated alkyl silane, notably a perfluoroalkylsilane of the formula:

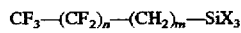

where "N" lies between 0 and 12, "M" lies between 2 and 5 and "X" is a hydrolyzable group.

The invention also has as its subject the method of obtaining the above defined products, which preferably include depositing the thin film by pyrolysis in the gas phase. As the starting compounds, at least two precursors are used, including a silicon precursor and an aluminum precursor. The relative proportions and the temperature of deposition are modulated to adjust the chemical formulation and/or the refractive index of the films. In fact, without yet speaking of the third element M, depending upon the quantity of silicon and the quantity of aluminum in the film, it is possible to approach the refractive index of silica or, in contrast, that of alumina.

The presence of the third element M, preferably of fluorine, has found its usefulness, notably, by the choice of deposition by pyrolysis. It has been observed in a fairly inexplicable way that the "codeposit" of aluminum oxide and silicon oxide from their respective "precursors" is difficult, especially when the precursors are organometallic and/or organosilicon compounds. The problem is a lack of uniformity in the film, with a tendency to obtain two superimposed films, one richer in $SiO_2$, the other in $Al_2O_3$, rather than a homogeneous film. Since the objective of the invention is not a priori to obtain a film having a composition gradient, it was discovered that the addition of an additive, such as fluorine, greatly facilitated, unexpectedly, the codeposition of silicon and aluminum, forming a mixed oxide film with a refractive index and chemical composition constant throughout the thickness of the film. Additive M additionally enables the speed of deposition of the film to be increased.

However, it would be too limiting to link the use of this additive to a film deposition by pyrolysis. Its presence in the final film, whatever the method by which it was obtained, contributes to the durability properties of the film.

For deposition of a film by pyrolysis in the gas phase, a silicon precursor, preferably an organosiliceous precursor or a mixture of organosiliceous precursors, are chosen from the following group: tetraethyl orthosilicate, termed TEOS and having the formula $Si(OC_2H_3)_4$, hexamethyl disilane, termed HMDS and having the formula $(CH_3)_3Si—Si—(CH_3)_3$, hexamethyl disiloxane termed HMDSO and having the formula $(CH_3)_3Si—O—Si—(CH_3)_3$, octamethyl cyclotetrasiloxane termed OMCTS and having the formula $((CH_3)_2SiO)_4$, tetramethyl cyclotetrasiloxane termed TOMCATS and having the formula $(CH_3HSiO)_4$, tetramethyl silane termed TMS having the formula $Si(CH_3)_4$ and hexamethyl disilazane termed HMDSN having the formula $(CH_3)_3—SiNH—Si(CH_3)_3$.

The aluminum precursor is preferably of the organometallic type, more preferably having an alcoholate and/or β-diketone function of the aluminum acetylacetonate type, or methyl 2-heptadiene-4,6-aluminum, termed also aluminum isovalerylacetonate.

The precursor of the third element M may also be the precursor of silicon and/or aluminum. Since these last two precursors have hydrocarbon radicals, if fluorine is chosen as element M, it is only necessary to substitute all or part of the hydrogen atoms of these precursors with fluorine atoms. It is advantageously possible to use an aluminum precursor in the form of a hexafluorinated acetylacetonate, or an aluminum trifluoroacetyl acetonate.

It may be preferable to introduce the element M into the film via a precursor independent of that of the silicon or the aluminum, such as a fluorinated gas, for example, $CF_4$, when M is fluorine. The film may also contain traces of carbon, for which it is usually unnecessary to provide a separate precursor, since the carbon can usually originate from the silicon or aluminum precursor having carbon containing groups.

Depending upon the deposition conditions, and the atmosphere in which it is carried out, it may be necessary to add a precursor containing oxygen in order to form an oxide. The precursor may be pure oxygen $O_2$, or a "softer" oxidizing gas, such as $H_2O$, $CO_2$, $N_2O$, or "stronger" oxidizing as, such as ozone, $O_3$.

The deposition temperature is correlated to the choice of the precursors. It preferably lies between 400° and 650° C., more preferably between 450° and 550° C., even more preferably between 480° and 520° C. It is then possible to deposit the film continuously on a ribbon of glass from a production installation for flat glass of the "float" type, and especially at the exit from the float bath, for example in the annealing lehr in which the temperature of the glass ribbon is within the aforementioned temperature range. By depositing the film of the invention "downstream" of the float line, it is possible to deposit other thin films by pyrolysis, in solid, liquid or gas phase prior to depositing the film of the invention. In this way the entire stack of films is continuously manufactured on the ribbon, which is economically a great advantage.

The invention thus makes possible the manufacture of filtering solar control panes, with stacks of the type:

glass/TiN/mixed oxide the mixed oxide of the invention making it possible, on the one hand, to reduce the reflective appearance of the substrate on the "film side", and on the other hand to protect the TiN film capable of deterioration and, notably, of oxidizing, especially when the glass is subsequently subjected to a heat treatment for annealing, bending or toughening.

The mixed oxides of the invention may also be associated with low-emissivity films having stacks of the type:

glass/SiOC/$SnO_2$:F/mixed oxide

In this case, since the film of $SnO_2$:F is intrinsically durable, the mixed oxide of the invention will, above all, have an optical role in combination with the film of SiOC which is situated below that of $SnO_2$:F. The mixed oxide of the invention may also be situated in a stack of the antireflective type with one or more sequences of oxide (low-index)/oxide (high-index), the low-index mixed film according to this invention constituting at least the last film.

The invention provides the possibility of producing any type of functional pane having thin films, which are of great durability and which, by resisting oxidation at high temperature, are also able to be toughened and/or bent when glass substrates are used.

EXAMPLES

Having generally described this invention, a further understanding can be obtained by reference to certain specific examples which are provided herein for purposes of illustration only and are not intended to be limiting unless otherwise specified.

The details and advantageous characteristics of the invention will be apparent from the following description of non-limiting examples of embodiment given with the help of the attached FIG. 1. This figure is not in proportion with regard to the relative thicknesses of the various materials, in the interest of clarity. These examples relate to the manufacture of low-emissivity panes, using substrates 1 of clear silicosodo-calcique glass of 6 nm thickness, which is coated with three films in succession: a first film termed "underlying film 2" of SiOC, produced by gaseous phase pyrolysis of silane and ethylene, as described in patent application EP-0 518 755; a second film termed "functional" low-emissivity film 3 of $SnO_2$:F, produced in known manner by powder pyrolysis from dibutyl tin difluoride, and a third film known as "overlying film 4", which is that of the invention. This type of stack comprising 3 films is that described in French patent application FR-2 704 543 and European patent application EP-0 544 577, to which reference may be made for more details.

In all the examples, the underlying film of SiOC has a geometric thickness of 55 nm and a refractive index of approximately 1.75, and a functional film of $SnO_2$:F has a geometric thickness of 300 nm and a refractive index of approximately 1.9 to 2.

REFERENCE EXAMPLES 1 TO 3:

Reference example 1 uses an overlying film 4 of $SiO_2$ of 90±5 nm and refractive index 1.45, produced by gaseous phase pyrolysis from TEOS (tetraethyl orthosilicate) at a temperature of 500° C.

Reference example 2 uses an overlying film 4 of $Al_2O_3$, produced by pyrolysis of aluminum tri-isopropylate at a temperature of 500° C., as described in patent application EP-0 500 445, of thickness approximately 95 nm and a refractive index of 1.60.

Reference example 3 uses an overlying film 4 of $SiO_2$, containing traces of fluorine, of 88±5 nm thickness and refractive index 1.44, produced by gaseous phase pyrolysis from TEOS and $CF_4$ at 500° C.

EXAMPLES 4 TO 10:

These are the examples according to the invention, in which the overlying film of the invention is produced by gas phase pyrolysis of a mixture of aluminum hexafluoroacetyl acetonate, of tetraethyl orthosilicate (TEOS) and oxygen, at a deposition temperature between 480° and 520° C. The proportion by volume between TEOS and the hexafluorinated acetyl acetonate is modulated empirically to a value of between 1 and 7. The proportion by volume between oxygen and TEOS is modulated empirically to a value of between 2 and 7. The temperature of deposition is also modulated in the aforementioned range. Overlying films 4 are then obtained of the formula $SiAl_xO_yF_z C_u$ of geometric thickness 90±5 nm and with a variable refractive index.

Table 1 below summarizes, for each of the examples, the refractive index of the overlying film 4 and the coefficients x, y, z, and u which relate to it.

TABLE 1

|  | x (Al) | y (O) | z (F) | u (C) | refractive index |
|---|---|---|---|---|---|
| Example 4 | 0.06 | 2.09 | 0.01 | 0.01 | 1.45 |
| Example 5 | 0.07 | 2.11 | 0.02 | 0.01 | 1.45 |
| Example 6 | 0.14 | 2.21 | 0.01 | 0.03 | 1.47 |
| Example 7 | 0.27 | 2.40 | 0.04 | 0.04 | 1.48 |
| Example 8 | 0.29 | 2.43 | 0.04 | 0.03 | 1.49 |
| Example 9 | 0.33 | 2.50 | 0.05 | 0.04 | 1.49 |
| Example 10 | 0.74 | 3.11 | 0.15 | 0.12 | 1.54 |

Table 2 below groups the following spectrophotometric values for some of these examples: the light transmission $T_L$ as a percentage, the light reflection $R_L$, as a percentage, the dominant wavelength λ dom(R) in reflection in nm and the purity of color in reflection p(r) as a percentage, the values being measured according to illuminant $D_{65}$.

TABLE 2

|  | $T_L$ | $R_L$ | λ dom(R) | p (r) |
|---|---|---|---|---|
| Reference example 1 | 82.5 | 5.5 | 489 | 10 |
| Reference example 2 | 77 | 11 | 634 | 11 |
| Reference example 3 | 77.4 | 10.6 | 590 | 20 |
| Example 7 | 82 | 6 | 490 | 2.7 |

It is found that the overlying films 4 of examples 4 to 10 according to the invention, considered individually, are insulating on the electrical plane, very smooth because they have a rugosity of at most 10 angstrom units (mean of the peak-to-valley distances at the surfaces of the film measured by atomic force microscopy). The overlying films of this invention, in addition, are slightly hydrophobic, with an angle of contact of water on their surface of from 42° to 60°, and in particular an angle of contact of 52° for the overlying film of example 8.

By comparison, the contact angle of water on the surface of the overlying film of $SiO_2$ according to reference example 1 is 30°.

On each of the coated substrates according to examples 1 to 10, two tests were carried out:

The first enables the chemical durability of the stack to be evaluated and is termed the neutral saline mist test. It is described in the standard ISO 9227 and consists of dipping the substrate in a neutral saline mist of 50 g/l NaCl salt at a temperature of 35° C. and pH of 6.5 to 7.2 until the instant at which the first detectable defects appear. The thin films are considered as having passed the test if they resist at least 480 hours, or 20 days. All the substrates of examples 4 to 10 according to the invention withstand more than 21 days without exhibiting any defect visible to the eye which would be due to deteriorations in the stack.

It has been established that, beyond 21 days, the overlying films of the invention which resisted for the longest periods were those in which the chemical composition contained aluminum with a value of x greater than 0.15. Thus, if example 7 is considered, after 28 days the value of $R_L$ has increased by only 0.6%, to change to 6.6%. The value of λ dom(R) has changed to 492 nm, and therefore still entirely within the same blue-green tonality in reflection, a color which remains very attenuated because the purity p(r) has gained only 0.1% to change to 2.8%.

The results of this test are very different for the three reference examples. The overlying film 4 of $SiO_2$ of reference example 1 deteriorates very rapidly: it is attacked from the seventh day and only traces of it remain after 14 days. This leaching manifests itself by a radical modification of the appearance in reflection on the "film face" of the substrate. At the 14th day, the value of $R_L$ has more than doubled to reach 11%, the value of λ dom(R) has changed to 617 nm and the purity p(r) to 12%. The substrate has a more brilliant appearance in reflection, its coloration has become purple, and furthermore is more intense. The overlying film, being destroyed, no longer fulfills its optical function.

With regard to reference example 2, the overlying film of $Al_2O_3$ is attacked after the 14th day, after which the appearance in reflection of the substrate also undergoes changes: the value of $R_L$ changes to 15%, the λ dom(R) to 544 nm and the purity p(r) to 19%. The substrate therefore becomes more "brilliantat" in reflection with a color that is clearly more intense because the purity has almost doubled.

Regarding reference example 3, the overlying film of $SiO_2$ containing fluorine is attacked from the 7th day, the results being similar to those obtained for reference example 1.

The second test is sometimes known as the "Taber" test and enables the mechanical strength of the stack to be evaluated. This test is carried out with the use of grinders made of abrasive powder embedded in an elastomer. The machine is manufactured by the company TABER INSTRUMENT CORPORATION. It is model 174 "Standard Abrasion Tester", and the grinders are of type CS10F, loaded with 500 g. Each substrate is subjected locally to 2000 revolutions, and the light transmission $T_L$ of the zone subjected to the abrasion is then measured at 550 nm before ($T_{LC}$) and after ($T_L2000$) abrasion, as well as its saturation C* in reflection before (C*o) and after (C*2000) abrasion. The saturation C* is, in the colorimetry system (L, a*, b*), the value equal to $(a^{*}+b^{*2})^{1/2}$ and enables the intensity of the coloration in reflection in this system to be evaluated.

The whole of examples 4 to 10 according to the invention shows that the variation of $T_L$ equal to $(T_L 2000-T_{LC})$ is at most 3%, and the variation in saturation (C*2000−C*o) is at most 8%. These variations indicate only a slight deterioration and therefore reveal a resistance of the overlying films of the invention to scratching that is at least as good as that of the overlying films of pure $SiO_2$ according to reference example 1.

It may be noted, furthermore, that to attempt to deposit by pyrolysis a mixed Si, Al oxide film without any additive of the fluorine type, (for example by using an aluminum precursor, the hydrogens of which are not substituted) leads to the production of a very inhomogeneous film comprising two "strata", the one of $Sio_2$ and the other of $Al_2O_3$ with a diffuse interface, a film that does not have any of the properties of the film according to the invention which contains fluorine, notably with regard to the chemical and mechanical durability.

In conclusion, it will be seen that the "mixed" films according to the invention resist mechanical abrasion and chemical attacks very well, which is not the case with the films of $Al_2O_3$ or of $SiO_2$, even when fluorine is added.

There is therefore an advantageous synergistic effect in the combination of the different elements of the films of the invention. It is possible to vary the relative proportions of each of these elements to optimize a given characteristic. Thus, more aluminum will enable the refractive index to be increased. With regard to the chemical durability, it has already been mentioned that to choose a value of x of more that 0.15 was favorable. It is also possible to take into account the rate of deposition, and it has been observed that the overlying films according to examples 8 and 9 deposit at a higher speed than the others.

The codeposition by gas phase pyrolysis appears to demand, if these properties are to be guaranteed, the presence of an additive of the fluorine type.

The mixed oxide of the invention has the subsidiary advantage of precipitating by pyrolysis much more rapidly than pure silica, approximately 10 times faster in comparable deposition conditions. Its deposition temperature enables the deposition of three-film stacks in line on the float glass ribbon to be envisaged without problems, with, for example, the underlying film of SiOC in the float bath by gas pyrolysis, the functional film in or at the exit from the float bath, and the overlying film according to the invention in the annealing lehr, or just after the functional film, in order to protect it immediately against oxidation when it is deposited in a substoichiometric state of oxygen.

The film according to the invention is particularly suitable for serving as a "last film" in stacks containing a functional film of the filtering or low-emissivity type on panes, because it can fulfil an optical function, notably by optimizing the appearance in reflection. On account of its durability it maintains its function over a long period of time. It is thus possible to guarantee a constancy with time of the appearance of the panes.

The use of the film according to the invention as the last film of a stack allows, once the totality of the stack has been deposited, the glass substrate carrying the stack to be bent or toughened without notable deterioration of the properties of the stack, the film forming a barrier against oxidation. Furthermore, the light transmission $T_L$ is kept constant.

It is, however, self-evident that it may also be used in another configuration, in stacks of thin films, especially as the first film of a stack for a "bonding" function and/or as a barrier against alkalines.

Whether or not a bending/toughening of the substrate takes place, the film of the invention as "overlying film" clearly makes possible the long-term storage of the substrates without requiring sophisticated packaging. It also makes possible the mounting of the substrates as a glazing pane with the stack of thin films exposed to the atmosphere, without any need to fear attacks of the type resulting from cleaning or atmospheric pollution.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A product comprising
   (a) a transparent substrate, and
   (b) a homogeneous thin film, on said substrate;
   wherein said homogeneous thin film is formed by pyrolysis and comprises a mixed oxide of silicon and aluminum, and an additive amount of an element M, which is a halogen.

2. The product of claim 1, wherein M is a fluorine.

3. The product of claim 1, wherein said homogeneous thin film further comprises element M'.

4. The product of claim 1, wherein said homogeneous thin film further comprises carbon.

5. The product of claim 3, wherein said homogeneous thin film has a chemical formulation $SiAl_xO_yM_zM'_u$.

6. The product of claim 1, wherein said homogeneous thin film has a chemical formulation $SiAl_xO_yM_zM'_u$, where M is fluorine, M' is carbon, x is 0.06 to 0.74, y is 2.1 to 3.1, z is 0.02 to 0.15 and u is 0 to 0.15.

7. The product of claim 1, wherein said homogeneous thin film has a chemical formulation $SiAl_xO_yM_zM'_u$, where M is fluorine, M' is carbon, x is 0.14 to 0.33, y is 2.3 to 2.5, z is 0.04 to 0.08 and u is 0.03 to 0.04.

8. The product of claim 1, wherein said homogeneous thin film has a geometric thickness of 30 to 180 nm.

9. The product of claim 1, wherein said homogeneous thin film has a geometric thickness of 60 to 160 nm.

10. The product of claim 1, wherein said homogeneous thin film has a geometric thickness of 80 to 140 nm.

11. The product of claim 1, wherein said homogeneous thin film has a refractive index of 1.42 to 1.60.

12. The product of claim 1, wherein said homogeneous thin film has a refractive index of 1.44 and 1.46.

13. The product of claim 1, wherein said product further comprises:
   (c) a functional film.

14. The product of claim 13, wherein said functional film is selected from the group consisting of an electrically conductive film, a low-emissivity film, a selective film, an antisolar film and an antireflective film.

15. The product of claim 13, wherein said functional film comprises a doped metallic oxide, metallic nitride, or metallic oxynitride.

16. The product of claim 13, wherein said functional film comprises a material selected from the group consisting of tin oxide doped with fluorine, indium oxide doped with tin, zinc oxide doped with indium, zinc oxide doped with fluorine, zinc oxide doped with aluminum, zinc oxide doped tin and titanium nitride.

17. The product of claim 1, wherein said product comprises alternating oxide films of high refractive index and low refractive index, including said homogeneous thin film.

18. The product of claim 1, wherein there is no film on said homogeneous thin film.

19. The product of claim 1, wherein said homogeneous thin film is in contact with said substrate.

20. A method for preparing a product comprising:
pyrolizing in the gas phase at least a first and a second precursor, thereby depositing a homogeneous thin film on a transparent substrate,
wherein said first precursor comprises silicon, said second precursor comprises aluminum, and wherein said first or second precursor further comprises a halogen, and said homogeneous thin film comprises a mixed oxide of silicon and aluminum and an additive amount of an element M, which is a halogen.

21. The method of claim 20, wherein said first precursor is selected from the group consisting of tetraethyl orthosilicate, hexamethyl disilane, hexamethyl disiloxane, octamethyl cyclotetrasiloxane, tetramethyl cyclotetrasiloxane, tetramethyl silane and hexamethyl disilazane.

22. The method of claim 20, wherein said second precursor is an organometallic precursor having an alcoholate group or β-diketone group.

23. The method of claim 20, wherein said second precursor is selected from the group consisting of aluminum acetylacetonate and methyl 2-heptadiene-4,6-aluminum.

24. The method of claim 20, wherein said second precursor is selected from the group consisting of a hexafluorinated acetylacetonate or a trifluoroacetonate.

25. The method of claim 20, wherein a third precursor is pyrolized during said pyrolizing and said third precursor comprises M.

26. The method of claim 25, wherein said third precursor is $CF_4$ and M is fluorine.

27. The method of claim 20, wherein a gaseous precursor of oxygen selected from the group consisting of $O_2$, $H_2O$, $CO_2$, $N_2$ and $O_3$, is present during said pyrolizing.

28. The method of claim 20, wherein said homogeneous thin film is deposited at a temperature of 400°–550° C.

29. The method of claim 20, wherein said homogeneous thin film is deposited at a temperature of 450°–550° C.

30. The method of claim 20, wherein said homogeneous thin film is deposited continuously onto a ribbon of float glass.

31. The method of claim 20, further comprising:
depositing one or more other thin films by pyrolysis, prior to depositing said homogeneous thin film.

32. A pane comprising:
a homogeneous thin film, on a transparent substrate;
wherein said homogeneous thin film is formed by pyrolysis and comprises a mixed oxide of silicon and aluminum, and an additive amount of an element M, which is a halogen.

* * * * *